United States Patent
Wu et al.

(10) Patent No.: US 8,776,240 B1
(45) Date of Patent: Jul. 8, 2014

(54) PRE-SCAN BY HISTORICAL URL ACCESS

(75) Inventors: Weimin Wu, Nanjing (CN); Kai Yu, Nanjing (CN); Yiping Shen, Nanjing (CN); Xuewen Zhu, Nanjing (CN); Xingqi Ding, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 204 days.

(21) Appl. No.: 13/105,379

(22) Filed: May 11, 2011

(51) Int. Cl.
*G06F 11/00* (2006.01)

(52) U.S. Cl.
USPC .................... 726/25; 726/22; 726/23; 726/24

(58) Field of Classification Search
USPC ............................. 726/22–25; 380/240–242
See application file for complete search history.

(56) References Cited

U.S. PATENT DOCUMENTS

| | | | |
|---|---|---|---|
| 7,328,456 B1* | 2/2008 | Szor et al. | 726/26 |
| 7,331,062 B2* | 2/2008 | Alagna et al. | 726/23 |
| 8,185,956 B1* | 5/2012 | Bogorad et al. | 726/25 |
| 2009/0038011 A1* | 2/2009 | Nadathur | 726/24 |
| 2009/0144826 A2* | 6/2009 | Piccard | 726/24 |
| 2010/0017383 A1* | 1/2010 | Gaucas | 707/5 |
| 2011/0072514 A1* | 3/2011 | Gilder et al. | 726/22 |
| 2012/0272319 A1* | 10/2012 | Shi et al. | 726/24 |

OTHER PUBLICATIONS

Wu et al., Examining Web-based Spyware Invasion with Stateful Behavior Monitoring, IEEE 2007, 13th IEEE International Symposium on Pacific Rim Dependable Computing, pp. 275-281.*
Yangui et al., Worm Detection in an IPv6 Internet, IEEE 2009, 2009 International Conference on Computational Intelligence and Security, pp. 366-370.*

* cited by examiner

*Primary Examiner* — Luu Pham
*Assistant Examiner* — Roderick Tolentino
(74) *Attorney, Agent, or Firm* — Beyer Law Group LLP

(57) ABSTRACT

A Web browser or operating system of a computer maintains a historical URL list of Web sites and Web pages that have been accessed in the past. When a prescan module of antivirus software performs an initial prescan of a computer before the antivirus software is installed, it queries this historical URL list to obtain the URLs that have been accessed in the past. These URLs are sent to a URL online query service located remotely over the Internet in order to determine the status of any of these URLs. Each URL is attempted to be matched with a database of known malicious URLs including associated malicious files and associated cleanup patterns. The query service then informs the requesting computer of the status of a particular URL sent, sending back any related malicious files and any appropriate cleanup pattern. A time period associated with each URL in the database indicates when it is known that the URL was malicious.

16 Claims, 10 Drawing Sheets

Overview

Pre-Scan System

Obtain URLs Example

| Key | Type | Value |
|---|---|---|
| ▽WebHistoryDates — 360 | Array | (3165 items) |
| ▽Item 0 | Diction... | (7 items) |
| | String | http://developer.apple.com/library/ios/documentation/Cocoa/Conceptual/OOP_Objc/ |
| ▷D | Array | (1 item) |
| displayTitle | String | Object-Oriented Programming with Objective-C |
| lastVisitedDate | String | 566357165.0 |
| ▷redirectURLs | Array | (1 item) |
| title | String | Object-Oriented Programming with Objective-C |
| visitCount | Number | 1 |
| ▽Item 1 | Diction... | (7 items) |
| | String | http://developer.apple.com/library/ios/documentation/Cocoa/Conceptual/ObjRuntimeGuide/ |
| ▷D | Array | (1 item) |
| displayTitle | String | Objective-C Runtime Programming Guide |
| lastVisitedDate | String | 566357158.4 |
| ▷redirectURLs | Array | (1 item) |
| title | String | Objective-C Runtime Programming Guide |
| visitCount | Number | 1 |
| ▽Item 2 | Diction... | (7 items) |
| | String | http://developer.apple.com/library/ios/documentation/Cocoa/Conceptual/ObjectiveC/ |
| ▷D | Array | (1 item) |
| displayTitle | String | Objective-C Runtime Programming Language |
| lastVisitedDate | String | 566357142.0 |
| ▷redirectURLs | Array | (1 item)    350 |
| title | String | Objective-C Runtime Programming Language |
| visitCount | Number | 1 |
| ▽Item 3 | Diction... | (7 items) |
| | String | http://developer.apple.com/search/index.php |
| ▷D | Array | (1 item) |
| displayTitle | String | Search Page |
| lastVisitedDate | String | 566357131.8 |
| lastVisitWasHTTPNonGet | Boolean | YES |
| title | String | Search Page |
| visitCount | Number | 1 |
| ▽Item 4 | Diction... | (6 items) |
| | String | http://developer.apple.com/programs/mac/team.html — 362 |
| ▷D | Array | (1 item) |
| displayTitle | String | Development Team - Mac Devel...r Program - Apple Developer |
| lastVisitedDate | String | 566357117.0 — 364 |
| title | String | Development Team - Mac Devel...r Program - Apple Developer |
| visitCount | Number | 1 |
| ▽Item 5 | Diction... | (6 items) |
| | String | http://developer.apple.com/programs/mac/distribution.html |
| ▷D | Array | (1 item) |
| displayTitle | String | Mac App Store - Mac Developer Program - Apple Developer |
| lastVisitedDate | String | 566357000.3 |
| title | String | Mac App Store - Mac Developer Program - Apple Developer |
| visitCount | Number | 1 |
| ▷Item 6 | Diction... | (6 items) |
| ▷Item 7 | Diction... | (8 items) |
| ▷Item 8 | Diction... | (7 items) |
| ▷Item 9 | Diction... | (6 items) |
| ▷Item 10 | Diction... | (6 items) |
| ▷Item 11 | Diction... | (7 items) |

*FIG. 4B*
Obtain URLs Example

Query Service Database

Monitor Module

PRE-SCAN BY HISTORICAL URL ACCESS

FIELD OF THE INVENTION

The present invention relates generally to scanning for malware on a computer. More specifically, the present invention relates to a pre-scan technique using historical URLs.

BACKGROUND OF THE INVENTION

As malicious software or "malware" becomes more common, new techniques are being developed by antivirus service providers to combat the threat. Current techniques involve using signature-based detection, heuristic-based detection and file emulation. Signature-based detection uses a pattern of virus signatures to compare to existing files on a computer; the pattern of virus signatures is based upon previously obtained samples of viruses and requires frequent updates of the pattern. A virus signature is only obtained after a malware sample is obtained, analyzed and the signature created. Accordingly, a virus pattern may not be up to date and may not include signatures of the latest malware circulating.

Heuristic-based detection techniques (also called behavior-based detection) do not necessarily require a virus pattern to detect malware, but instead base detection of malware upon activities of the malware, its behavior, and other indications that a certain type of malware is operating within a computer. In other words, certain "rules of thumb" (or heuristics) are associated with a certain type of malware and are used to detect that type of malware. Heuristic-based detection requires that the antivirus software have installed a heuristic or behavior monitor.

File emulation is a type of heuristic approach to detection of malware that requires obtaining a copy of the suspected malware program and executing it within a safe environment and monitoring the actions that it performs. This approach requires identifying the suspected malware beforehand and having available a safe, virtual environment in which to test the suspected malware. A type of malware known as a rootkit is especially troublesome and is designed to gain administrator-level control over a computer without the user's knowledge. A rootkit can change how the operating system functions and can also disable antivirus software; detecting a rootkit usually requires installation of a special anti-rootkit module of the antivirus software.

Some sophisticated malware is even able to thwart installation of antivirus software upon a computer, thus preventing the antivirus software from detecting the malware. Such malware may block the installation of the antivirus software, may stop the antivirus software from operating or may render the antivirus software somewhat ineffective. In order to detect such sophisticated malware, an antivirus service provider may use a pre-scan software module to perform a quick scan before the antivirus software is installed and a full-blown scan occurs. A pre-scan currently operates by scanning a computer's hard disk, memory and registry using a signature-based virus pattern file. This pre-scan can be effective because its pattern may detect malware on the disk, and since the antivirus software is not being installed the malware is ineffective at thwarting installation.

Unfortunately, there are disadvantages to performing a pre-scan. For one, the virus pattern used by the prescan module may not be up to date; if the pattern does not cover the latest malware present on the computer the malware will not be detected. A prescan cannot perform heuristic-based detection because no heuristic or behavior monitor has been installed. Also, no anti-root kit module has been installed so no detection of a possible rootkit can be performed. Additionally, in order to speed up the process, typically only critical areas of the disk or the operating system are checked during a prescan; this may mean that some malware is missed. Accordingly, a technique is desired that would improve the effectiveness of a prescan in order to better detect malware before antivirus software is installed.

SUMMARY OF THE INVENTION

To achieve the foregoing, and in accordance with the purpose of the present invention, a prescan technique is disclosed that uses historical URL information in order to improve the effectiveness of the prescan.

The present invention provides a faster, targeted prescan, and a quicker response to the latest malware. The invention is fast because its scope is limited to analysis of browser history and its contained URLs. New malware may be detected more quickly because a malicious URL may be added relatively quickly to the online service, instead of waiting for new malware to be analyzed and for a new virus pattern to be created and downloaded. The invention is able to counteract rootkit malware because the cleanup pattern in the online service database includes specific patterns to repair the damage caused by a rootkit.

In one embodiment, a prescan system includes a computer with a browser history of previously accessed URLs, and an online query service including a database of records. Each record contains a malicious URL, a time period when it is known that the URL was malicious, any related malicious files, any relevant cryptographic signatures of the malicious files, and any relevant cleanup patterns appropriate for responding to damage caused by any of the malicious files downloaded by that URL. The computer is arranged to query the online query service with a list of URLs and in return receive a list of malicious URLs that may have been accessed by the computer, possible malicious files that may have been downloaded from those URLs, and any associated cleanup patterns.

In a second embodiment, a method of scanning a computer system for malicious software includes a prescan module. The prescan module may be downloaded onto the computer along with antivirus software, but the prescan module is executed before the antivirus software is installed. The prescan module obtains a list of URLs previously accessed by the computer and sends these URLs, along with their timestamps, to an online query service. The query service attempts to match each URL with an entry in a database, each entry including a malicious URL, related malicious files, and any cleanup pattern relevant to repairing damage caused by any of the malicious files. If a match occurs, the information in the matching entry is sent back to the computer system.

In a third embodiment, a method for automatically generating a database of malicious files includes a monitor module located on a computer. The monitor monitors network data and obtains URLs and associated files downloaded from those URLs. A cryptographic signature of each downloaded file is calculated. In parallel, the monitor monitors payloads dropped via a Web browser, determines the file path of each file and also calculates a cryptographic signature for each file. If a match occurs between cryptographic signatures then the location on disk of a downloaded file has been determined and its URL is known. This information may be added to a database associated with antivirus software. Once a malicious file is detected by a detection module in the antivirus software it is determined whether this malicious file is also present in this database created by the monitor module. If so, then relevant information (URL, malicious files, etc.) is sent automatically over a network connection to an online URL query service for later use.

Typically, malware is usually installed before being executed, and it will drop more components and files. Thus, not only the downloaded file, but also any dropped files are also related to the URL. If any one of these files is detected, this information is sent to the online URL query service. Further, malware is almost always dropped in the same folder, even in different computers. So if we know where the malware is located, searching for the malicious file on the entire disk can be avoided.

BRIEF DESCRIPTION OF THE DRAWINGS

The invention, together with further advantages thereof, may best be understood by reference to the following description taken in conjunction with the accompanying drawings in which:

FIG. 4B illustrates another example of obtaining historical URLs from an Apple operating system.

DETAILED DESCRIPTION OF THE INVENTION

As mentioned above, while a prescan of computer system can be very useful in detecting malware before antivirus software is installed, there is room for improvement. It is realized that much malware now arrives on a user's computer via the Internet rather than from floppy disks as in the recent past. For example, it is believed that around 70% of the top Web sites viewed by computer users actually distribute malware or provide a link to malware. It is also believed that out of all of the known infection channels for malware (floppy disk, USB drive, electronic mail, installation of software, etc.), the vast majority of malware arrives from the World Wide Web via the computer's Web browser.

Given that malware may infect a computer and be present even before installation of antivirus software, and that much malware originates from the Web, it is further realized that a prescan used to detect previous Web browsing activity may be useful in detecting malware present on a computer.

Figure 1:
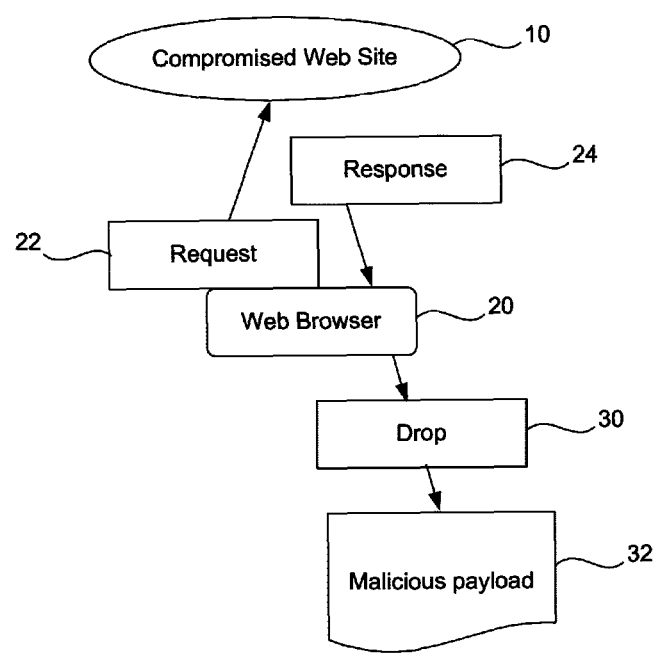
FIG. 1 illustrates one way in which malware infects a computer.

FIG. 1 illustrates one way in which malware infects a computer. A Web site 10 available over the Internet may become infected by malware such as by SQL injection.

When a user desires to view that Web site it is possible that the malware present may infect his or her computer. A user will typically use a Web browser 20 installed upon his or her computer to generate a request 22 of a particular site. This request is generated by the user typing in a particular URL (e.g., http://uspto.gov), or by the user clicking upon a URL link within a Web site in which case the browser generates and sends the request based on the URL. Once the site 10 receives the request the site 10 generates a response 24 and the desired Web page is downloaded to the user's Web browser 20. If the site has been affected by malware, it is possible that the response 24 and the resulting downloaded Web page includes malware. For example, the HTML code of the downloaded Web page may include malware designed to "drop" (or store) a malicious file onto the user's computer or to initiate a malicious process.

Once the infected page is present within the user's browser and the HTML code for that page executes, it is possible for the malware to drop 30 a malicious payload 32 (i.e., a malicious file) onto the user's computer. Because a Web browser typically will record a historical list of all URLs accessed by that browser, there would exist in that list the URL of the Web page from where the malware came.

Overview

Figure 2:
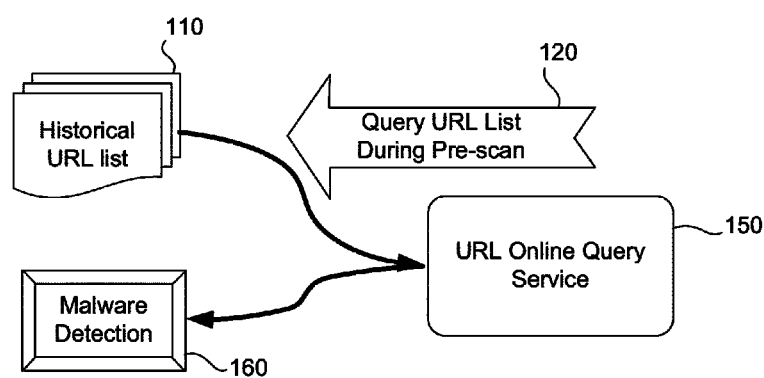
FIG. 2 illustrates an overview of one embodiment of the invention.

FIG. 2 illustrates an overview of one embodiment of the invention. As mentioned above, typically a Web browser or operating system of a computer will maintain a historical URL list 110 of Web sites and Web pages that have been accessed in the past. When a prescan module of antivirus software performs an initial prescan of a computer before the antivirus software is installed, it is able to query 120 this historical URL list 110 in order to obtain the URLs that have been accessed in the past. Because it is possible that one or more of these URLs may have provided a path for malware to infect the present computer system, it can be useful to perform further analysis on these URLs.

Accordingly, these URLs may be sent to a URL online query service 150 located remotely over the Internet in order to determine the status of any of these URLs. For example, this online query service may be a Web site reputation service (WRS) operated by an antivirus service provider. The query service will be able to assist in malware detection 160 on the requesting computer by informing the local computer of the status of a particular URL, for example, whether the URL is known as a malicious URL, whether any particular known malware files are associated with the URL, which computer files the malware may infect, any particular cleanup techniques, patterns or files that may be useful to counteract the malware.

Figure 3:
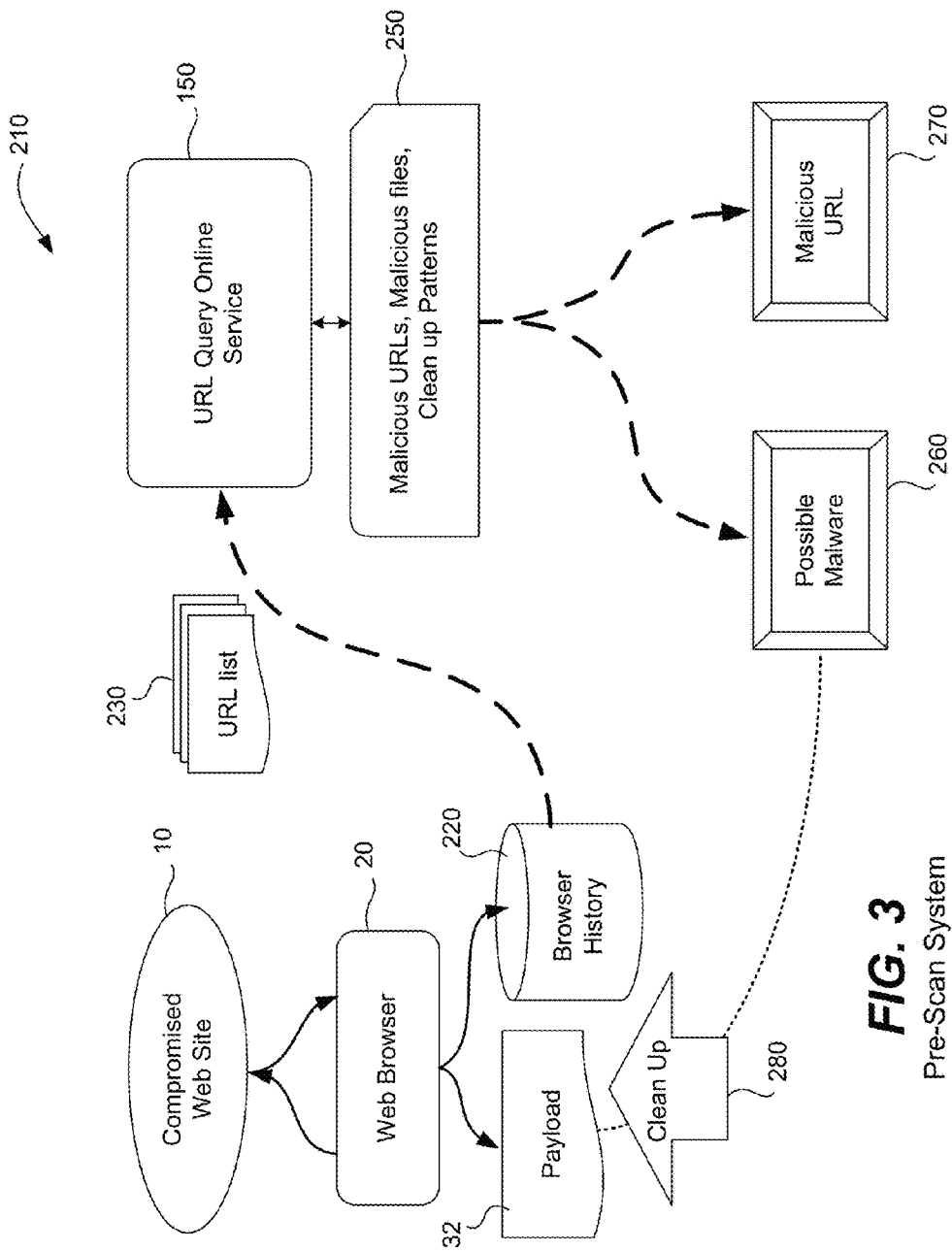
FIG. 3 illustrates a prescan system according to one embodiment of the invention.

FIG. 3 illustrates a prescan system 210 according to one embodiment of the invention. As previously mentioned, a Web browser 20 operating on a local, user computer may inadvertently download malware over the Internet from a compromised Web site 10 resulting in a malicious payload 32 infecting the user computer with malware. A browser history database 220 includes information on all URLs, Web sites and Web pages that have been accessed by the computer in the past. During a prescan, a list 230 of previously accessed URLs is obtained from this database 220 in is sent over the Internet to a remote URL query online service 150. This service includes a database 250 of known malicious URLs, known malicious files associated with each of these URLs, and cleanup patterns appropriate for removing malware or repairing damage caused by malware. If any URL in the list matches with the database, then a malicious URL 270 is identified, possible malware 260 may also be identified, and any cleanup pattern 280 may be delivered back to the user computer to assist in either removing the malware or cleaning up its damage.

Figure 4A:
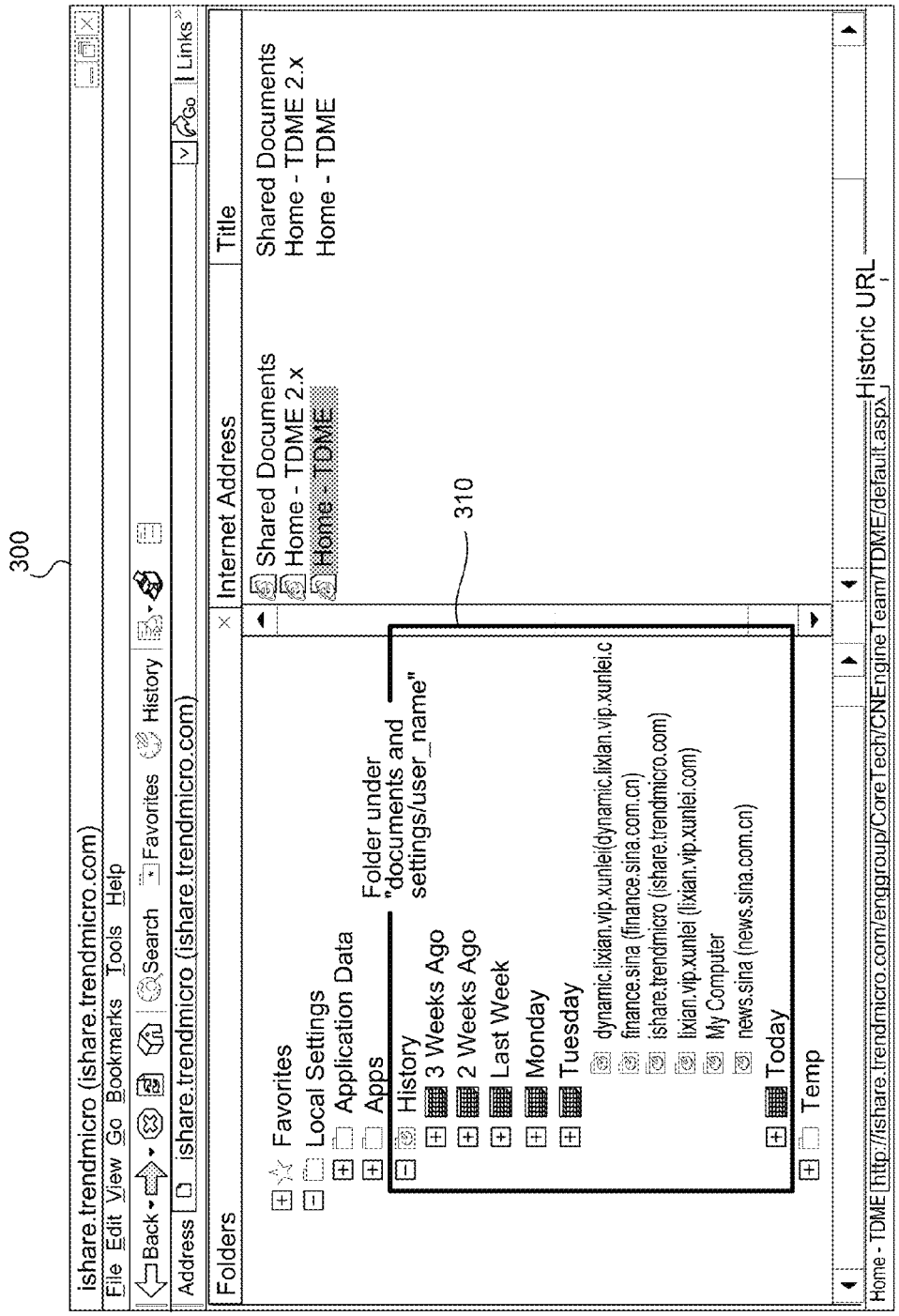
FIG. 4A illustrates an example of obtaining historical URLs.

FIG. 4A illustrates an example of obtaining historical URLs. Shown is a window 300 showing folders on a user computer. As shown, portion 310 illustrates a history folder which includes any number of URLs that have been accessed previously using a browser of the computer. URLs may be accessed for a specific time period such as any hour of the current day, any previous day, the previous week, or earlier. Obtaining any previous URL accessed by the computer is performed by searching in one of the folders shown. Although this example shows access using the Internet Explorer Web browser, any other Web browser or operating system may be used.

FIG. 4B illustrates another example of obtaining historical URLs from an Apple operating system. Shown is a window 350 showing history data on a user computer. As shown, identifier 360 opens a history folder which includes any number of URLs that have been accessed previously using a browser of the computer. For example, shown is a URL 362 accessed on the date 364. Other URLs and dates are also shown. Obtaining any previous URL accessed by the computer is performed by searching in the folder shown. For example, if the Safari browser is used on the Apple operating system, then historical URLs may be accessed using the data in window 350.

Detailed Examples

Figure 5:
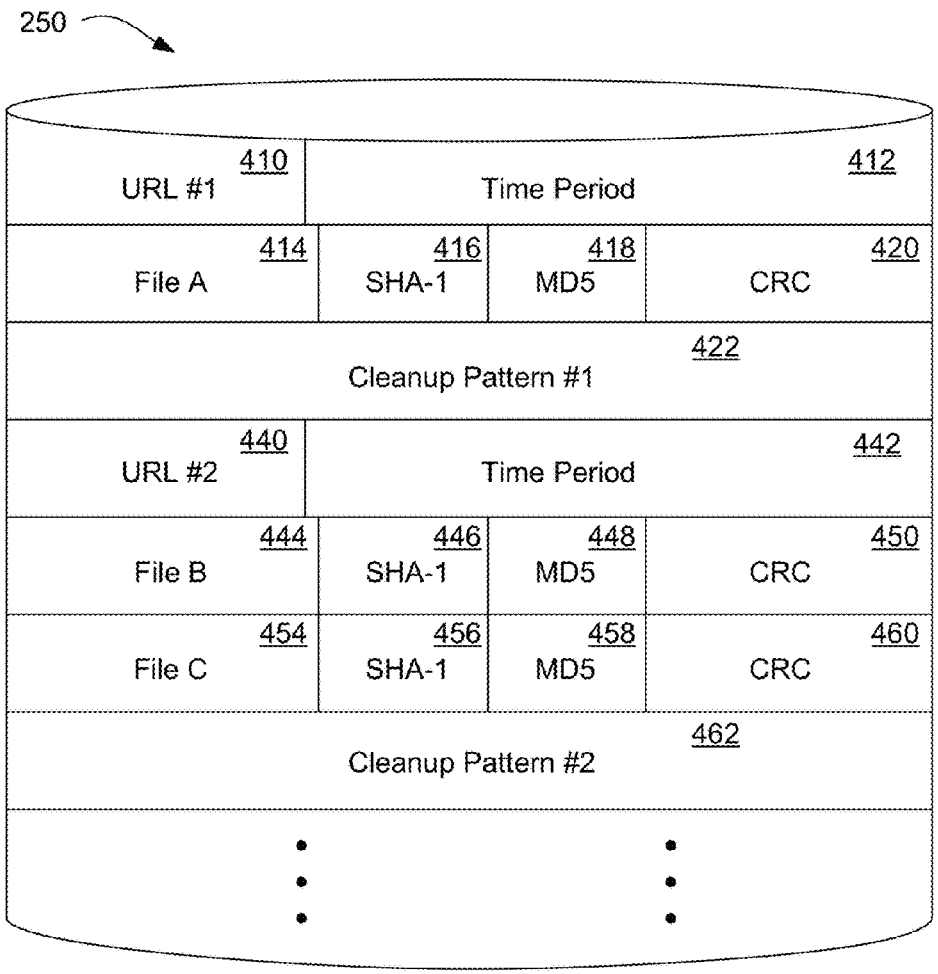
FIG. 5 illustrates an example of a query service database that may be used by the URL query online service.

FIG. 5 illustrates an example of a query service database 250 that may be used by the URL query online service 150. As mentioned above, once the online service receives a list of URLs from a client computer it is able to compare each of these URLs to its database in order to determine if any of the received URLs are malicious. Preferably, database 250 contains URLs that are known to be malicious, certain files known to be malicious, and any known cleanup pattern associated with a particular URL.

For example, URL 410 is known to be malicious and is present in the database. Presence of a URL in the database indicates that the URL contains malware at its site, links to known malware, or is known to download malware to user computers without user acknowledgement.

Associated with URL 410 are any number of fields 412-422. A time period 412 is associated with each URL and indicates that time period when it is known that the URL is malicious. For example, it is possible that a particular URL used to be malicious but the owner has since cleaned up the site and removed all malware. In this situation, the time period might specify a particular date before which it is known that the site was malicious. Conversely, should a site become known as malicious as of a certain time, then the field 412 would indicate a particular date after which it is known that the site is malicious. Field 412 may also specify a date range in which it is known that the site was malicious. For example, if a site becomes compromised by a hacker but then is later restored by the owner to be malware free, time period 412 may specify a date range (e.g., Jan. 5, 2011 through Feb. 5, 2011) in which it is known that the URL was malicious. A URL that was accessed outside of this time period may be considered benign.

Any number of related files may be listed in association with URL 410 indicating that the listed file is a malware file and might possibly be downloaded from that URL. Shown is a file 414 along with optionally listed unique identifiers such as its SHA-1 value, its MD5 value, and its CRC value. The file name may be provided in field 414 including the full file name, an abbreviated file name, or a file name that includes wildcard characters. The listed file names and identifiers provide a way for a client computer to search for this malware and to eliminate it. File names 414 also include registry entries and names of processes as well as traditional file names.

Also included in association with URL will 410 is a cleanup pattern 422. A cleanup pattern may indicate which antivirus engine (or module) to use, which malicious files or other malicious components can be cleaned, and which sequence should be used, all in order to allow a client computer to remove any malware or to repair damage caused by that malware.

Any number of malicious URLs and associated files and cleanup patterns may be present within the database. For example, URL 440 is listed along with its associated fields 442-462. In this example, two files 444 and 454 are associated with the malicious URL 440. It may be the case that the malicious URL has dropped both of these files, or that the URL dropped only file 444 and later on file 444 was responsible for dropping or creating malicious file 454.

Flow Diagram

Figure 6:
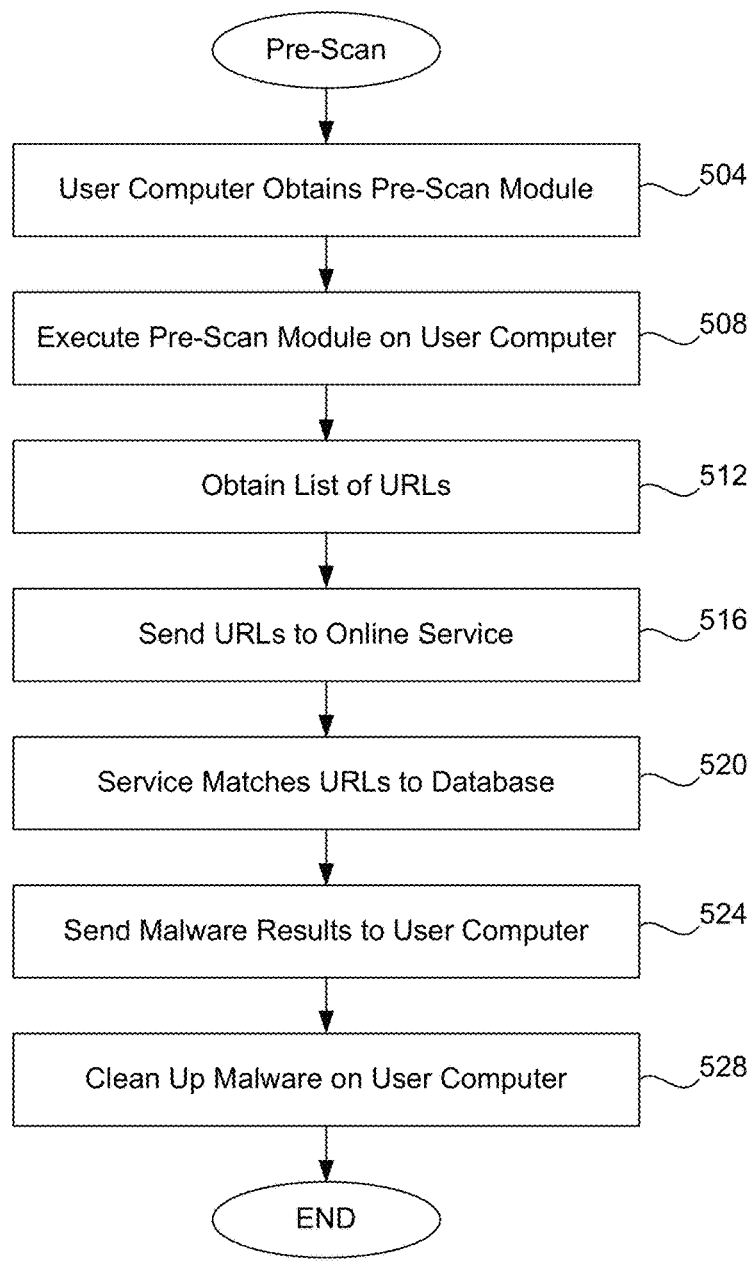
FIG. 6 is a flow diagram describing use of a prescan to detect malware.

FIG. 6 is a flow diagram describing use of a prescan to detect malware. In step 504 a user computer obtains the prescan module which will perform the prescan of the user computer in accordance with the present invention. Typically, the prescan module is included within a larger antivirus software package and the prescan module is designed to execute and perform an initial scan of the user computer before the entire antivirus software package is installed. The antivirus software may be copied onto a hard disk or other persistent storage on a computer system by downloading the antivirus software over a wired Internet connection, by downloading the software over a wireless Internet connection, by transferring the software wirelessly from another device, or by inserting a media device such as a CD-ROM, DVD, flash drive or other device into the user computer and copying the software. Because the prescan module is part of the antivirus software it will likewise be copied onto the user computer the same time.

Alternatively, the prescan module may be a standalone module that is separate from the main antivirus software package, and this prescan module is copied onto the user computer separately from the antivirus software. The prescan module may be copied before the antivirus software is copied or after. In any case, after the prescan module has been copied onto the user computer it is ready for execution. In one embodiment, the prescan module is an application set of one or more applications that stores all of its needed data within the applications themselves.

In step 508 the prescan module is executed upon the user computer. As known in the art, many software modules can simply be executed on a computer by copying the software to the computer and executing it or "running" it without further installation procedures. Accordingly, the prescan module is executed such that no other installation steps occur that would normally be detected by malware. Therefore, the prescan module can execute without the risk that it will be detected by malware that might be present on the user's computer. A prescan module will normally scan the memory of the computer, scan its running processes and registry in order to determine if any malware is currently present.

Because the entire antivirus software package is not being installed at this time, it is unlikely that any malware will detect that the prescan module is executing. Installation (or setup) a software program (including any drivers, plug-ins, etc.) typically requires use of a general purpose or dedicated installer program ("installer") to handle the installation. Installation of a complex software program may involve: unpacking the files in compressed form and copying them into folders on disk; tailoring the software to suit the hardware and user preferences; providing information about the software to the operating system; registering services; creating shared program files or directories; creating or modifying registry or configuration file entries; and modifying environment variables links and shortcuts. Because malware is sometimes able to detect that these activities are occurring and thwart the installation of software, a prescan module that is able to execute without needing to be installed is advantageous.

In step 512 the executing prescan module obtains a list of previously accessed URLs from the user computer. The module may be configured to only retrieve URLs accessed during the previous day, the previous week, the previous month etc., or any particular previous time period. The URLs may be retrieved from a particular browser using different methods. As shown in FIGS. 4A and 4B, these URLs may be accessed by referring to URL history folders that each browser maintains amongst its program files. Alternatively, a browser may maintain a cache, parameter files or even registry files that contain previously accessed URLs. As is known in the art, these URLs may also be accessed using a particular API or tools available within a software development kit (SDK). If different browsers are being used on a particular computer, it may be necessary to use different techniques in order to retrieve the URLs accessed by these different browsers during a previous time period. Also obtained for each URL is a timestamp indicating on which day, date or at which time the URL was accessed. The entire URL may be retrieved (e.g., http://uspto.gov) or simply the domain name or any sub domain. By convention, whichever form of the URL is retrieved is known and this information is used when attempting to match a URL to the database 250.

In step 516 the prescan module sends the obtained URL list 230 along with the timestamps over a suitable Internet connection to the URL query online service 150 that will typically be located in a remote service center, i.e., "in-the-cloud." In step 520 the service receives the list of URLs and attempts to match each received URL one-by-one with any entries in the database 250. The timestamp will also be compared to the time period field in the database to determine if a previously accessed URL was actually malicious at that time. In one embodiment, it is not strictly necessary to use the timestamp and the time period field, but use of this information can reduce false positives.

In step 524 any results from step 520 are sent back to the user computer that has initiated the query. The service may send back an identification of any URLs in the database 250 that have matched any of the URLs in the list sent by the user computer. For example the full URL may be matched and sent back (e.g., http://uspto.gov), a portion of the URL may be used to perform matching and may be sent back (e.g., "uspto.gov"), or a sub domain may be matched and sent back (e.g. "uspto.gov/publications"). Also, the names of any malicious files associated with a particular URL may be sent back to the user computer. Sending of the file names instead of (or in addition to) sending cryptographic hashes (such as an MD5 or SHA-1) can be advantageous if the malicious file has changed. For example, some malicious files are able to change their contents and avoid being matched by an MD5, but their file names may remain the same. Of course, any unique identifiers for a particular file such as fields 416-420 may also be sent back to the user computer for help in identifying malicious files. These unique identifiers by convention may be calculated based upon a file name, the entire contents of the file, a portion of the file, etc. In addition, any cleanup pattern associated with a particular malicious URL may also be sent to the user computer.

In step 528 the user computer receives any malware results from the online service and uses these results to cleanup any malware on the computer. For example, any received file names or file signatures may be used to determine if corresponding malicious files exist on the user computer and these files may be deleted. In addition, any received cleanup pattern may be used to repair damage caused by malware. Furthermore, any received malicious URL may be used to block that URL in the future, flag to the user that the URL is malicious, or other action may be taken.

Update Query Service Database

The previous flow diagram discusses use of query service database 250 that holds malicious URLs, files, patterns etc. It is possible to populate or update this database using a variety of techniques. In one simple example, malware on a single computer or on any number of computers may be analyzed manually to obtain malicious URLs, their associated files and any useful cleanup pattern. This information may then be sent manually to the query service database. Alternatively, the below embodiment discusses a technique for updating this database automatically.

Figure 7:
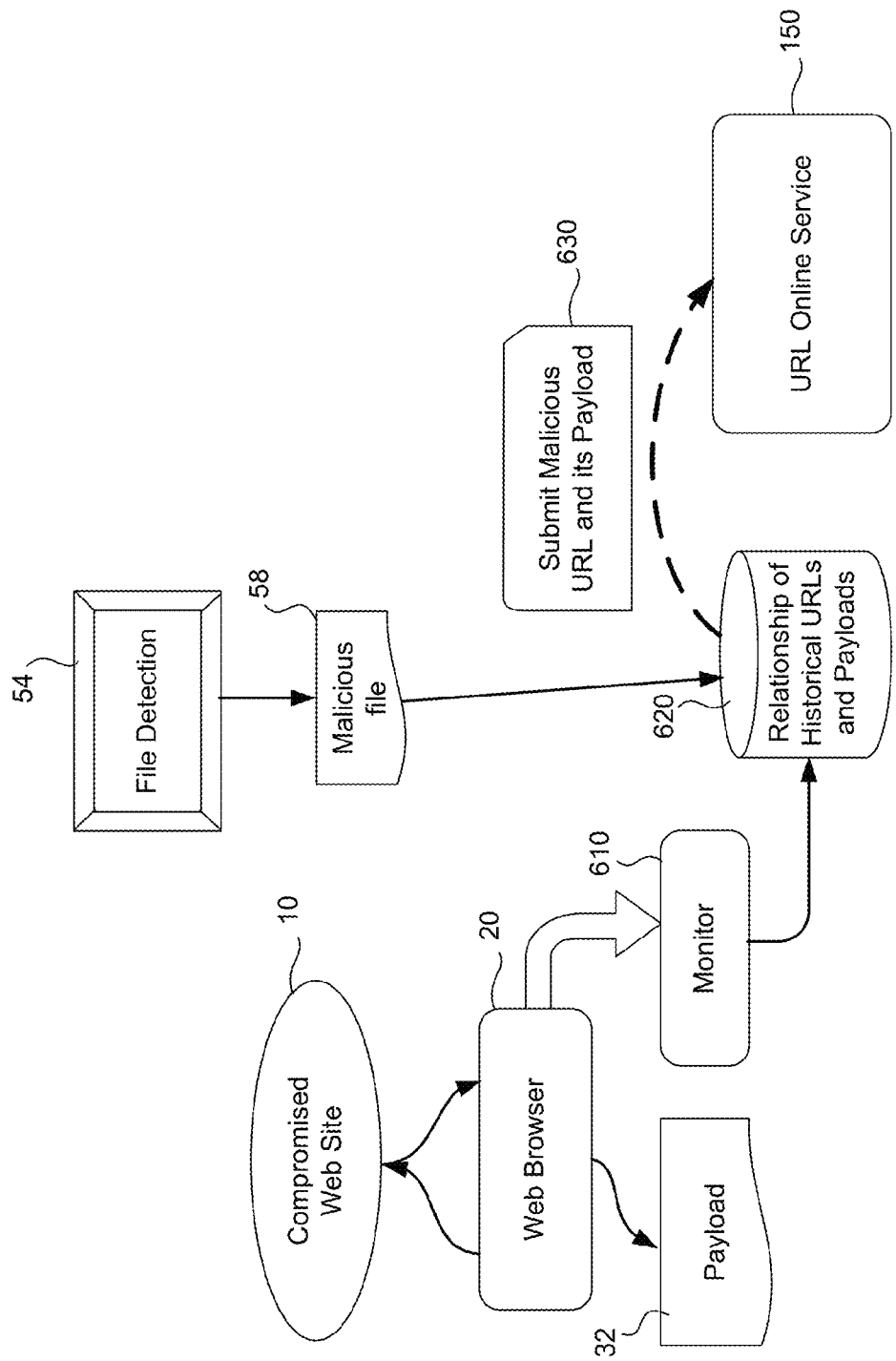
FIG. 7 illustrates a system for updating the query service database automatically.

FIG. 7 illustrates a system for updating the query service database automatically. Shown are elements 10, 20 and 32 present on a user computer that have been previously discussed. Elements 54, 58, 610, 620 and 630 may also be present upon this user computer. When the malware payload 32 is first downloaded from the site 10 via the browser 20 the malware may not be detected immediately, especially if the malware is new. Typically, it takes several customers to become infected by the malware before a detection pattern is created for that malware and an updated pattern is released. Therefore, it is possible that the payload 32 will execute upon the user computer and do damage to the computer.

The user computer has installed antivirus software which includes a monitor module 610 which is arranged to monitor URLs that are accessed, files that are downloaded from URLs, and changes to a computer system that might be caused by malware. For example, monitor 610 keeps track of which files are downloaded by particular URLs by monitoring network data, and keeps track of which payloads are dropped via a Web browser, as described in FIG. 8. Monitor 610 keeps track of these URLs and files downloaded by these URLs without knowing if any particular URLs or files are malicious. Because a virus pattern might not have been developed for a particular malicious file, it is possible that a URL will download a malicious file without the antivirus software being aware. This monitored information is sent to a database 620 on the user computer that records these URLs, downloaded files and any computer system changes. Even though a URL and its downloaded files have been recorded, the antivirus software at this point in time might not be aware that the URL and its downloaded file are malicious.

The antivirus software on the user computer also includes a malware file detection module 54 that may include traditional malware detection techniques using signatures, heuristics, etc. At some point in the future (perhaps hours or days later, after the monitor module has recorded a URL), the detection pattern will be updated in the file detection module 54, the computer will be scanned, and a malware file 58 will be detected. It is possible that this malicious file 58 has actually been previously downloaded by a particular URL that has already been recorded in database 620.

The antivirus software will then be able to query database 620 using malicious file 58 in order to obtain its source URL, any related malicious files, the location of that malicious file within the computer system, and any related system damage. The malicious file 58 may be compared to the files in database 620 by a comparison of file names, or by comparison of file signatures such as an MD5.

When the malicious file 58 is first identified as being malicious, it is not known from which URL it has downloaded by traditional technology. Monitor 610 monitors network data and it obtains the URL and file contents (used to calculate the signature). Concurrently, the monitor monitors file operation of the browser. If any file is dropped by the browser, the monitor can calculate the signature of that physical file also. Then, by comparison of signatures, the monitor obtains the relationship between the URL and downloaded file's path. Thus, from the information from monitor 610, when the malicious file 58 is identified as being malicious, the antivirus software will also know from which URL it has been downloaded.

Further, since database 620 accepts information from many computers, it is possible that the source URL already exists in the database. The same file, however, can be downloaded from different URLs (unfortunately, hackers may always do that). So, we cannot guarantee we can obtain the URL from database. Therefore, when the malicious file and its related URL is obtained from monitor, they will be compared to the database. If the same relationship already exists, nothing need be done. If the relationship does not exist, a new record is added.

This information may then be submitted 630 from the antivirus software on the user computer to the online service 150 in order to generate a new database entry in the query service database 250 of FIG. 5. Once this new entry is present in the database, then the previously described technique of FIG. 6 may use this information during a pre-scan.

Figure 8:
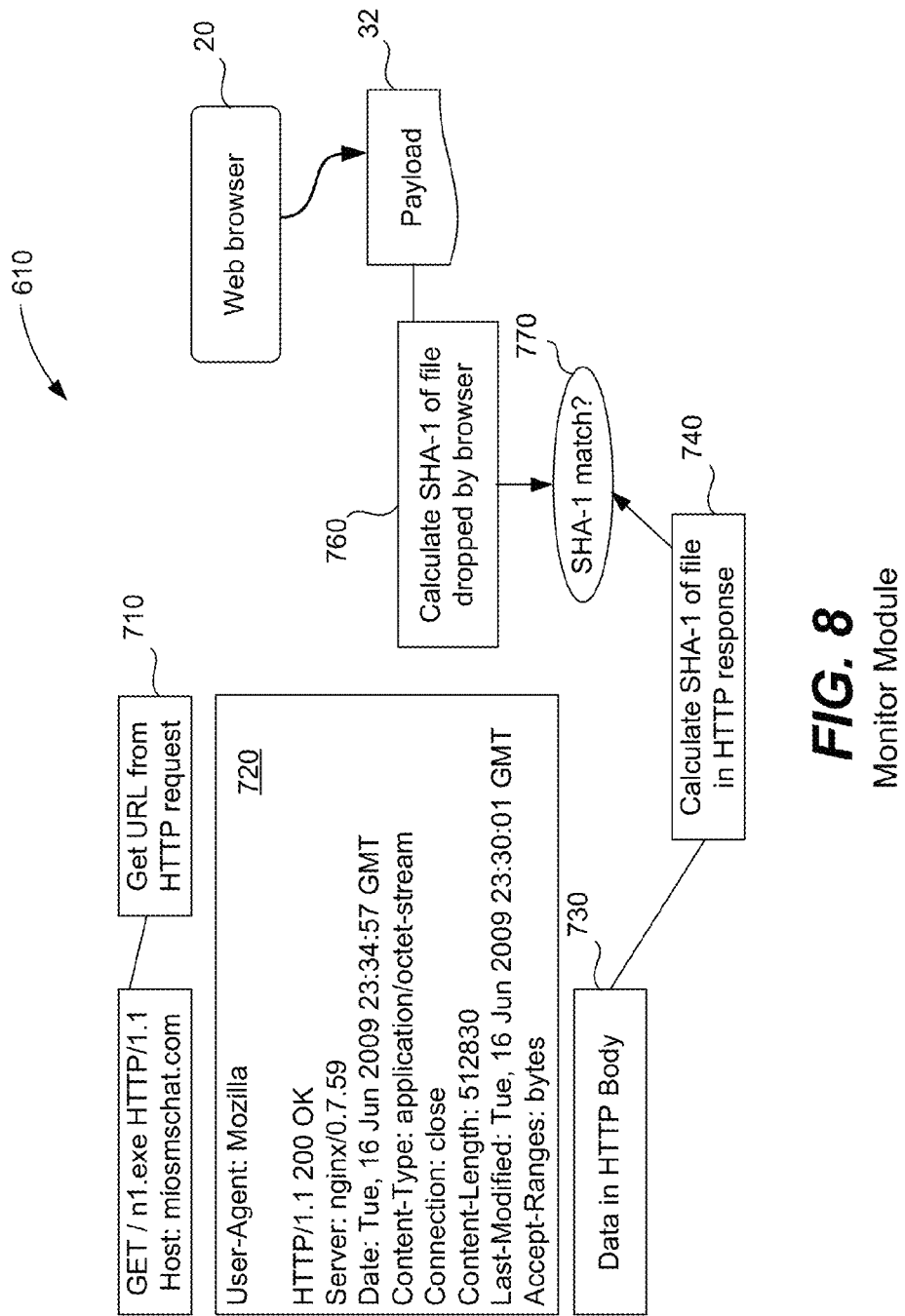
FIG. 8 illustrates a technique used by monitor module to identify the location of a malicious file and its URL.

FIG. 8 illustrates a technique used by monitor module 610 to identify the location of a malicious file and its URL. The previous figure discusses an accessed URL, its malicious payload, and the computer system damage caused by the payload. Traditional hooking techniques may be used to monitor the behavior of the payload in order to understand the computer system damage that it causes. But, there is a difficulty in understanding from exactly which URL the payload has originated because a Web browser typically downloads and saves payloads asynchronously. Traditional monitoring is based upon Windows API hooking. File downloading will use both a network API and a file API. When using the network API, the monitor gets data from the URL and store the data in memory. When using the file API, the monitor gets data from memory, and save the data to the file path which is assigned by the browser. So, whether using the network API or the file API, each technique may not know all of the information associated with the URL and file path.

Additionally, while monitoring network data communications may reveal a URL and its downloaded file, the location of that downloaded file within the computer system cannot be determined by simply monitoring network data.

Accordingly, in order to identify where a dropped file is located within a computer system, monitor module 610 uses the technique of Figure. In general, two separate hooking points are used to gather data and then the data is compared. The left side of FIG. 8 shows that the network data may be monitored by monitoring the HTTP stream. By monitoring this stream, a URL and its associated payload data may be obtained and then the SHA-1 of the payload may be calculated. Step 710 retrieves a particular HTTP protocol request and retrieves a particular URL. The HTTP protocol data 720 from that request is shown. Also include within the protocol is the data 730 of the HTTP body which will include any downloaded file. Step 740 calculates a unique signature of that downloaded file that is included within the HTTP response. The signature may be calculated using the SHA-1 algorithm, the MD5 algorithm or other.

In parallel, the monitor module may also be monitoring any file drop events from a Web browser 20. A particular file 32 may have been dropped at some point in time by the Web browser and the monitoring activity will be able to determine the file path of this file in order to determine its location on disk. Once a dropped file is identified, then in step 760 the antivirus software can similarly calculate a unique signature for this dropped file. Assuming that the same cryptographic algorithm is used in steps 740 and 760, step 770 will result in a match if the file dropped by the Web browser matches with the file found in the HTTP body. If a match is found, then the location of the file in the computer system associated with a particular URL response has been determined.

This information may then be added to database 620 of FIG. 7. Addition of a particular file, its location, and its associated URL from the technique of FIG. 8 at this point does not indicate that the dropped files malicious. Accordingly, FIG. 7 shows that a malicious file 58 has been detected using the antivirus software. If this malicious file matches a file added to database 620, then a malicious file has been identified along with its location within the computer system and its associated malicious URL. This information may then be transmitted 630 to the online service 150.

In an alternate embodiment, it is possible to compare the file in the data of the HTTP body 730 of FIG. 8 directly with the malicious file 58 of FIG. 7 in order to determine that a particular URL is malicious. FIG. 8 describes how to build the relationship between the downloaded file and its original URL. In an alternate implementation, the relationship can be discovered when there is a detection of a malicious file. For example, the steps are: 1. Malicious file is detected; 2. Confirm if it is downloaded from browser (optional); 3. Compute its signature; and 4. Compare with history information (URL signature) to obtain the original URL.

Computer System Embodiment

Figure 9A:
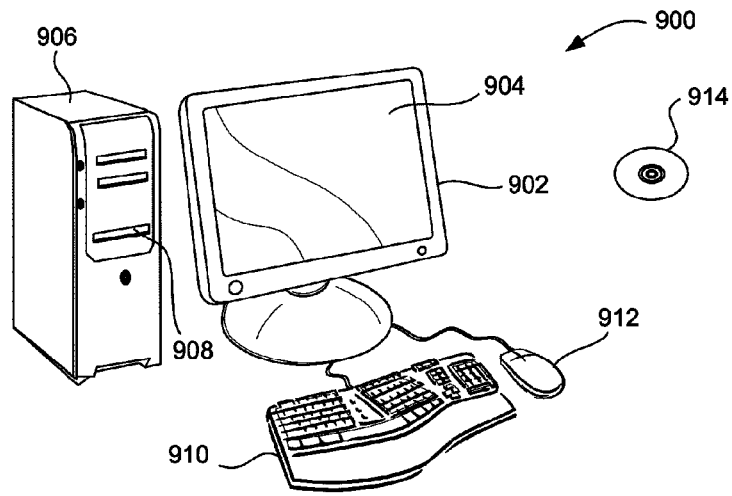
FIGS. 9A and 9B illustrate a computer system suitable for implementing embodiments of the present invention.
Figure 9B:
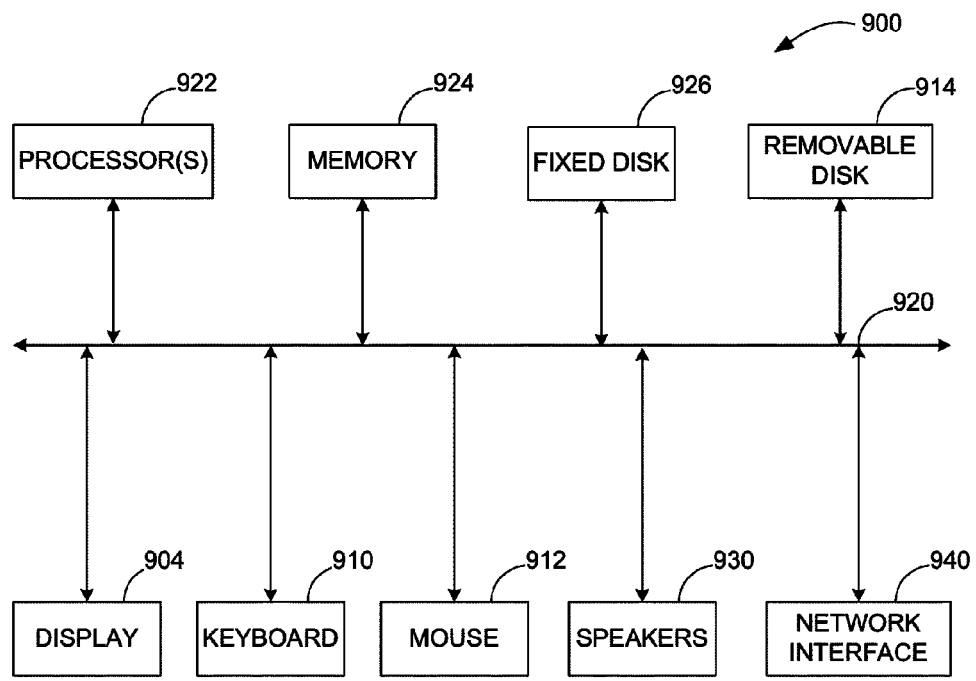

FIGS. 9A and 9B illustrate a computer system 900 suitable for implementing embodiments of the present invention. FIG. 9A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of performing a pre-scan of a computer system, said method comprising:
    downloading a malicious file onto said computer system before execution of a prescan module;
    initiating, by a computing device, execution of said prescan module before installation of antivirus software on said computer system to execute a prescan, the prescan comprising:
    retrieving a list of Uniform Resource Locators (URLs) that have been accessed using said computer system, said accessing occurring prior to said execution of said prescan module;
    sending said list of URLs over a network to an online service;
    receiving from said online service, before installation of said antivirus software, an identification of said malicious file present on said computer system, said malicious file having previously been downloaded from a URL in said list of URLs; and
    removing said malicious file from said computer system.

2. The method as recited in claim 1 further comprising:
    copying said antivirus software onto said computer system, said antivirus software including said prescan module.

3. The method as recited in claim 1 wherein said malicious file is not known to be malicious before said step of receiving.

4. The method as recited in claim 1 further comprising:
    receiving a cleanup pattern from said online service, said cleanup pattern arranged to repair damage caused by said malicious file.

5. The method as recited in claim 1 further comprising:
    sending, along with each of said URLs in said list of URLs, timestamp information indicating when said each of said URLs was accessed from said computer system.

6. The method as recited in claim 1, wherein said retrieving is performed by said prescan module and retrieves said list of URLs from said computer system, wherein said list of URLs are sent from said computer system, and wherein said computer system is unaware before said step of receiving that said malicious file is malicious.

7. A method of scanning a computer system, said method comprising:
    downloading a malicious file onto said computer system before execution of a prescan module;
    executing, by a computing device, said prescan module before installation of antivirus software on said computer system to execute a prescan, the prescan comprising:
    sending a list of Uniform Resource Locators (URLs) over a network to an online service from said computer system, each of said URLs having previously been accessed by said computer system;
    matching, by said online service, at least one of said URLs with a record in a database of said online service;
    sending an identification of said malicious file from said online service back to said computer system, said malicious file having previously been downloaded from said at least one of said URL in said list of URLs; and
    removing said malicious file from said computer system.

8. The method as recited in claim 7 further comprising:
    copying said antivirus software onto said computer system, said antivirus software including said prescan module.

9. The method as recited in claim 7 wherein said execution of said prescan module is unaffected by any malicious software on said computer system.

10. The method as recited in claim 7 wherein said malicious file is not known by said computer system to be malicious before said step of matching.

11. The method as recited in claim 7 further comprising:
    sending a cleanup pattern from said online service to said computer system, said cleanup pattern arranged to repair damage caused by said malicious file.

12. The method as recited in claim 7, wherein said step of sending a list of URLs is performed by said prescan module, wherein said computer system receives said identification of said malicious file before installation of said antivirus software, and wherein said computer system is unaware before said step of sending an identification that said malicious file is malicious.

13. A method of performing a pre-scan of a computer system, said method comprising:

downloading a malicious file onto said computer system before execution of a prescan module;

initiating, by a computing device, execution of said prescan module before installation of antivirus software on said computer system to execute a prescan, the prescan comprising:

retrieving a list of Uniform Resource Locators (URLs) that have been accessed using said computer system, said accessing occurring prior to said execution of said prescan module;

sending said list of URLs over a network to an online service;

receiving from said online service, before installation of said antivirus software, an identification of a malicious file present on said computer system, said malicious file having previously been downloaded from a URL in said list of URLs; and cleaning up said malicious file.

14. The method as recited in claim 13 further comprising:
receiving a cleanup pattern from said online service, said cleanup pattern arranged to remove said malicious file.

15. The method as recited in claim 13 further comprising:
receiving a cleanup pattern from said online service, said cleanup pattern arranged to repair damage caused by said malicious file.

16. The method as recited in claim 13, wherein said cleaning up said malicious file includes at least one of removing said malicious file and repairing damage caused by said malicious file.

* * * * *